(12) United States Patent
Toh et al.

(10) Patent No.: US 9,594,628 B2
(45) Date of Patent: Mar. 14, 2017

(54) OPERATIONAL VIBRATION COMPENSATION THROUGH MEDIA CACHE MANAGEMENT

(71) Applicant: Seagate Technology LLC, Cupertino, CA (US)

(72) Inventors: Michael J C Toh, Singapore (SG); WenXiang Xie, Singapore (SG); Xiong Liu, Singapore (SG); Timothy Richard Feldman, Louisville, CO (US); Paul Michael Wiggins, Longmont, CO (US); Gregory Paul Moller, Longmont, CO (US)

(73) Assignee: Segate Technology LLC, Cupertino, CA (US)

(*) Notice: Subject to any disclaimer, the term of this patent is extended or adjusted under 35 U.S.C. 154(b) by 227 days.

(21) Appl. No.: 14/447,202

(22) Filed: Jul. 30, 2014

(65) Prior Publication Data

US 2016/0034342 A1     Feb. 4, 2016

(51) Int. Cl.
*G06F 11/10* (2006.01)
*G06F 12/02* (2006.01)
*G06F 12/08* (2016.01)
*G06F 11/32* (2006.01)

(52) U.S. Cl.
CPC ...... *G06F 11/1044* (2013.01); *G06F 11/1064* (2013.01); *G06F 11/1072* (2013.01); *G06F 12/0246* (2013.01); *G06F 12/0875* (2013.01); *G06F 2212/2228* (2013.01); *G06F 2212/7211* (2013.01)

(58) Field of Classification Search
CPC ............ G06F 11/1044; G06F 11/1064; G06F 11/1072; G06F 12/0246; G06F 12/0875; G06F 2212/2228; G06F 2212/7211
See application file for complete search history.

(56) References Cited

U.S. PATENT DOCUMENTS

| 6,243,795 | B1 * | 6/2001 | Yang | G06F 11/1666 160/113 |
| 6,898,036 | B2 | 5/2005 | Gill et al. | |
| 7,085,087 | B2 | 8/2006 | Fukuhisa et al. | |
| 7,395,452 | B2 * | 7/2008 | Nicholson | G06F 1/30 711/E12.04 |

(Continued)

FOREIGN PATENT DOCUMENTS

JP     62197844 A  *  9/1987

*Primary Examiner* — April Y Blair
*Assistant Examiner* — Dipakkumar Gandhi
(74) *Attorney, Agent, or Firm* — Hall Estill Attorneys at Law (57) ABSTRACT

Apparatus and method for managing a media cache through the monitoring of operational vibration of a data storage device. In some embodiments, a non-volatile media cache of the data storage device is partitioned into at least first and second zones having different data recording characteristics. Input data are received for storage in a non-volatile main memory of the data storage device. An amount of operational vibration associated with the data storage device is measured. The input data are stored in a selected one of the first or second zones of the media cache prior to transfer to the main memory responsive to a comparison of the measured amount of operational vibration to a predetermined operational vibration threshold.

20 Claims, 6 Drawing Sheets

(56) References Cited

U.S. PATENT DOCUMENTS

| | | |
|---|---|---|
| 7,633,698 B2 | 12/2009 | Finamore et al. |
| 7,880,994 B2 | 2/2011 | Sato |
| 7,903,364 B2 | 3/2011 | Jeong |
| 7,921,331 B2 | 4/2011 | Bose et al. |
| 7,965,460 B2 | 6/2011 | Elliott |
| 8,037,348 B2 | 10/2011 | Wei et al. |
| 8,560,770 B2 | 10/2013 | Haines et al. |
| 9,087,540 B1 * | 7/2015 | Lee .................... G11B 5/59627 |
| 2006/0136672 A1 | 6/2006 | Chaudhry et al. |
| 2006/0215307 A1 | 9/2006 | Yoshida et al. |
| 2007/0033341 A1 * | 2/2007 | Hashimoto ........... G06F 12/084 |
| | | 711/113 |
| 2007/0204121 A1 * | 8/2007 | O'Connor ............. G06F 12/126 |
| | | 711/163 |
| 2008/0244183 A1 * | 10/2008 | Ishikawa ............... G06F 12/084 |
| | | 711/129 |
| 2008/0316639 A1 * | 12/2008 | Tang ....................... G11B 5/012 |
| | | 360/77.08 |
| 2009/0070651 A1 * | 3/2009 | Diggs ................ G06F 11/1068 |
| | | 714/752 |
| 2009/0097154 A1 * | 4/2009 | Raymond .......... G11B 5/59688 |
| | | 360/76 |
| 2013/0135764 A1 | 5/2013 | Dhanda et al. |
| 2013/0185511 A1 | 7/2013 | Sassone et al. |
| 2014/0068178 A1 | 3/2014 | Fisher et al. |
| 2014/0118795 A1 * | 5/2014 | Kusumoto ......... H04N 1/00018 |
| | | 358/406 |

\* cited by examiner

HARD DISC DRIVE (HDD)

OPERATIONAL VIBRATION COMPENSATION THROUGH MEDIA CACHE MANAGEMENT

SUMMARY

Various embodiments of the present disclosure are generally directed to an apparatus and method for managing a media cache through the monitoring of operational vibration of a storage device.

In accordance with some embodiments, a method includes partitioning a non-volatile media cache of a data storage device into at least first and second zones having different data recording characteristics. Input data are received for storage in a non-volatile main memory of the data storage device. An amount of operational vibration associated with the data storage device is measured. The input data are stored in a selected one of the first or second zones of the media cache prior to transfer to the main memory responsive to a comparison of the measured amount of operational vibration to a predetermined operational vibration threshold.

In accordance with other embodiments, a data storage device has a non-volatile main memory, a non-volatile media cache partitioned into respective first and second zones each having different recording characteristics, a sensor adapted to sense an amount of operational vibration applied to the data storage device, and a controller. The controller is adapted to store input data received from a host device in a selected one of the first or second zones of the media cache prior to transfer to the main memory responsive to a comparison of the sensed amount of operational vibration from the sensor to a predetermined operational vibration threshold.

In accordance with further embodiments, a data storage device includes a non-volatile rotatable data recording medium having a plurality of concentric data tracks divided into a main store and a media cache. The main store is configured for longer term storage of user data and the media cache configured for temporary storage of user data prior to transfer to the main store. The media cache is partitioned into at least a first zone and a second zone. The first zone has a first set of tracks at a first track density and the second zone has a second set of tracks at a different, second track density less than the first track density. A volatile buffer is adapted to temporarily store input user data received from a host. A sensor is adapted to generate a disturbance signal indicative of applied operational vibration to the data storage device. A controller is adapted to transfer the input user data from the buffer to a selected one of the first or second zones of the media cache responsive to a magnitude of the disturbance signal. The controller is further adapted to subsequently transfer the input user data from the selected one of the first or second zones of the media cache to the main store.

These and other features and advantages which may characterize various embodiments can be understood in view of the following detailed discussion and the accompanying drawings.

DETAILED DESCRIPTION

Various embodiments of the present disclosure are generally directed to the management of data via a media cache (MC) under different operational vibration (op vib) conditions.

Storage devices are electronic-based user devices that include digital memory configured to store and retrieve data associated with a user. Storage devices can take a variety of forms. More specific forms of storage devices can include hard disc drives (HDDs), solid-state drives (SSDs), hybrid drives, thumb drives, etc. More generalized forms of storage devices can include laptops, tablets, computers, smart phones, cameras, personal digital assistants, peripherals, music players, gaming consoles, display devices, network appliances, etc.

These and other forms of storage devices can be configured to include a non-volatile media cache (MC) to temporarily store write data and a non-volatile main memory (main store) for longer term storage of data. Data received from a host are temporarily stored in the media cache. The cached data are subsequently migrated from the media cache to the main store at a later time, such as during periods of low user input/output (I/O) activity. An upstream volatile write buffer (e.g. DRAM, etc.) can be used to initially receive the write data and then transfer the write data to the media cache as soon as possible.

Depending on the use environment, data storage devices can be subjected to various levels of operational vibration (op vib). The presence of operational vibration can adversely affect the operation of a data storage device by increasing the frequency and severity of write faults and other write event related errors.

Accordingly, various embodiments of the present disclosure are generally directed to an apparatus and method for compensating for different levels of operational vibration in a data storage device. As explained below, various embodiments provide a data storage device with a media cache (MC). The media cache operates as a non-volatile buffer memory to temporarily store input data from a host device pending transfer of the input data to a main memory (main store) of the data storage device.

The main cache is partitioned into multiple zones. A first zone has a relatively lower susceptibility to op vib, and a second zone has a relatively higher susceptibility to op vib. During an access operation in which input data are transferred to the media cache, a then-existing level of op vib is detected, and the input data are transferred to the first or second zones in relation to the detected level of op vib.

The first and second zones may constitute a common type of memory, or the zones may constitute different types of memory. Various operational parameters may be different for the first and second zones, such as write fault threshold levels, track widths, data densities, read/write voltages, etc. Other compensation techniques may be applied as well, such as the calculation of error detection and correction (EDC) codes at different performance (strength) levels for the different zones. In further embodiments, the compensation techniques applied to the respective MC zone to which the input data are written may be selected in relation to the magnitude of the detected op vib level during the data transfer operation.

Figure 1:
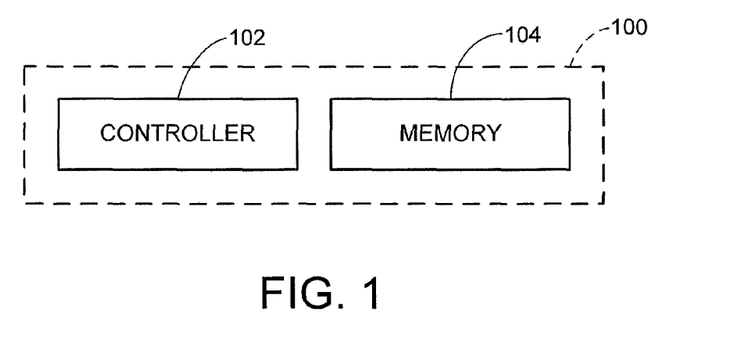
FIG. 1 provides a functional block representation of a data storage device in accordance with various embodiments of the present disclosure.

These and other features and advantages of various embodiments of the present disclosure can be understood beginning with a review of FIG. 1 which provides a functional block representation of an exemplary storage device 100. The storage device 100 is shown to include a controller 102 and a memory module 104.

The controller 102 provides top-level control of the device 100 and directs communications and data transfers with a host device (not separately shown). The controller 102 may be realized in hardware, software and/or firmware. The memory module 104 can take a variety of forms, and includes one or more forms of data storage memory to store user data supplied by the host device. Other operative elements can be incorporated into the storage device as required but are omitted for clarity.

Storage devices such as depicted in FIG. 1 can take a variety of forms, including but not limited to hard disc drives (HDDs), solid-state drives (SSDs), hybrid drives, thumb drives, laptops, tablets, computers, smart phones, cameras, personal digital assistants, peripherals, music players, gaming consoles, display devices, network appliances, or any other form of electronic device with the capacity to store data associated with a user of the device.

Figure 2:
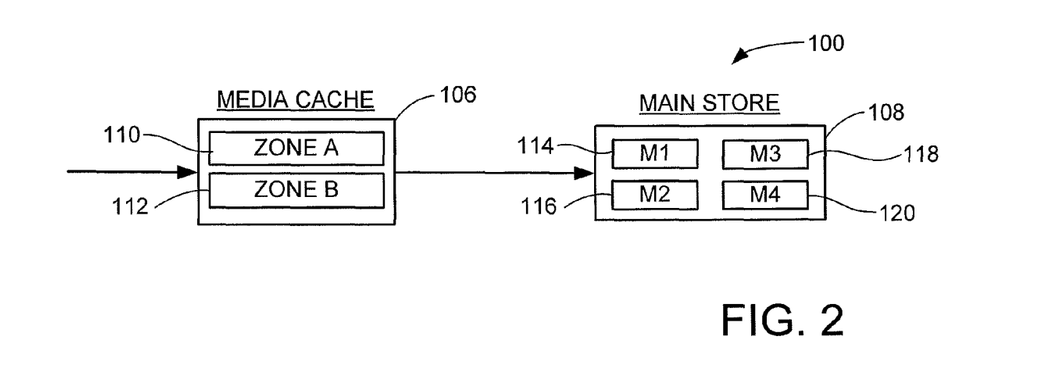
FIG. 2 is a functional block representation of a media cache and a main store of the storage device of FIG. 1 in accordance with some embodiments.

FIG. 2 generally illustrates aspects of the data storage device 100 of FIG. 1 in accordance with some embodiments. The memory module 104 includes a media cache (MC) 106 and a main memory (main store) 108. Input write data from the host device are temporarily buffered in the media cache 106 prior to transfer to the main memory 108.

The media cache 106 is partitioned into multiple zones, including a first zone (zone A) 110 that is relatively less susceptible to op vib and a second zone (zone B) 112 that is relatively more susceptible to op vib. As explained below, input data are written to a selected one of the zones 110, 112 depending on the detected level of op vib. During normal periods of operation in which the level of op vib is relatively low, the data are written to zone A. If excessive levels of op vib are detected, however, the data are written to zone B. Generally, zone B can be used as an overflow buffer to accommodate media cache data during periods of low op vib if zone A is full. Data are thereafter migrated to the main memory 108 with priority given to zone B.

FIG. 2 shows the main memory 108 to be provided with a number of memory locations capable of receiving the transferred input data. These memory locations are identified as locations M1-M4 (114, 116, 118, 120). In some embodiments, the target location to which data from the media cache 106 are transferred to the main memory 108 may also be selected based on the then-existing levels of op vib.

The media cache 106 and the main memory 108 can take a variety of forms, including but not limited to rotatable magnetic recording media, rotatable optical recording media, solid-state flash memory, spin-torque transfer random access memory (STRAM), resistive random access memory (RRAM), magnetic random access memory (MRAM), phase change random access memory (PCRAM), etc. The different forms of memory can further include different programming states or levels within a given type of memory, such as shingled (partially overlapping) or non-shingled data tracks, single level cell (SLC) or multi-level cell (MLC) programming states, etc.

In some embodiments, the media cache 106 and the main memory 108 take a common form, such as both being formed from rotatable magnetic recording media. In other embodiments, the media cache 106 takes a first form, such as solid-state memory and the main memory 108 takes a second form such as rotatable magnetic recording media.

In still further embodiments, the different zones in the media cache 106 take different forms, such as zone A being formed from rotatable magnetic recording media and zone B being formed of solid-state memory. Each of the respective memory locations M1-M4 may similarly constitute different types of memory such as various combinations of solid-state and rotatable media.

Figure 3:
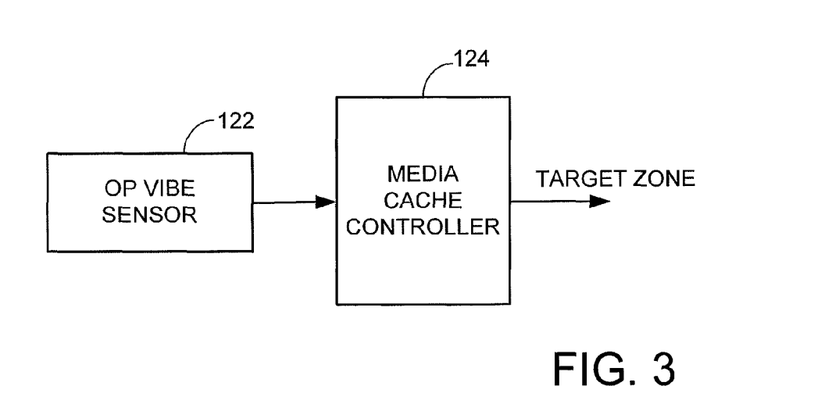
FIG. 3 shows an operational vibration (op vib) sensor in combination with a media cache controller of the embodiment of FIG. 2.

FIG. 3 shows an operational vibration (op vib) sensor 122 and a media cache controller 124 operable with the storage device 100 of FIG. 2. The op vib sensor 122 can take any suitable form to detect the application of mechanical shock and/or vibration events to the storage device 100. In some cases, the op vib sensor 122 may be an accelerometer having a piezo-electric or magnetostrictive construction. Acceleration may be detected along multiple (e.g., x, y, z) axes.

The media cache controller 124 may form a portion of the controller 102 (FIG. 1) and uses the received input signals from the sensor 122 to characterize the type and magnitude of operational vibration. The controller 124 may be configured to sense different types of shock/vibratory events including steady state vibration, free-fall, tumbling, impact events, etc.

The controller 124 can further include predictive capabilities to anticipate an upcoming shock/vibratory event based on the then-existing input from the sensor 122, such as an anticipated shock that is expected to occur in the near future based on the detection of rotating or flat-spin free-fall. The controller 124 accordingly identifies a target zone in the media cache for currently cached data responsive to the detected operational vibration.

Figure 4:
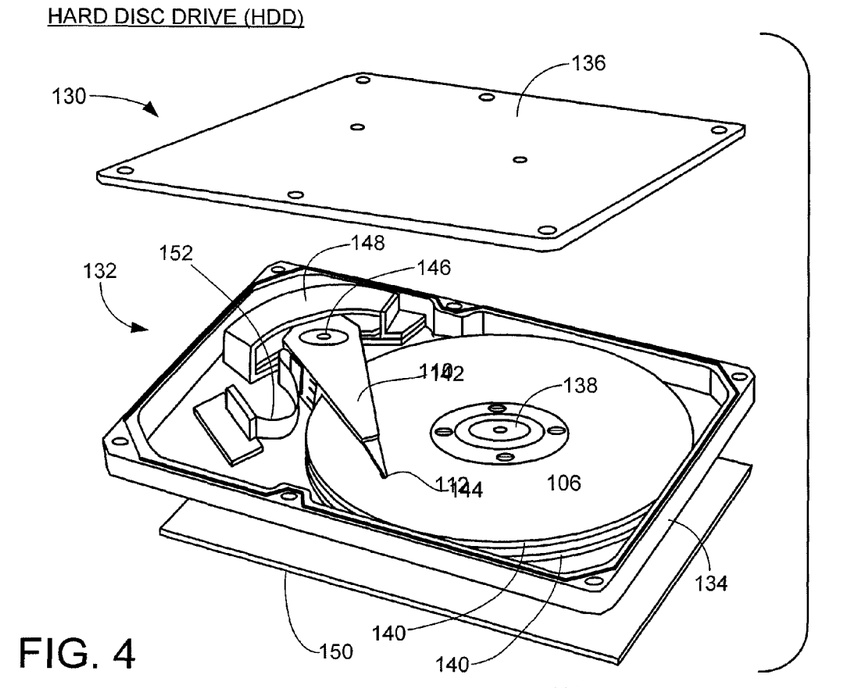
FIG. 4 is an exploded representational view of a data storage device of FIG. 1 characterized as a hard disc drive (HDD).

FIG. 4 shows a storage device 130 generally corresponding to the data storage device 100 of FIG. 1 in accordance with some embodiments. The data storage device 130 in FIG. 3 is characterized as a hard disc drive (HDD) of the type configured to store data from a host device, such as a computer or other host.

The HDD 130 includes a housing 132 formed from a rigid base deck 134 and top cover 136. A spindle motor 138 is arranged to rotate one or more (in this case, two) magnetic recording media (discs) 140 at a constant high speed during operation of the device 130. An actuator 142 supports a corresponding array of data transducers (read/write heads) 144 adjacent recording surfaces of the media 146. The actuator 142 pivots about a pivot shaft 146 through the controlled application of current to an actuator motor (voice coil motor, VCM) 148.

Control electronics including circuitry corresponding to the controller 102 in FIG. 1 and the sensor/controller arrangement of FIG. 3 are supported on an HDD printed circuit board assembly (PCBA) 150. A flex circuit assembly 152 provides electrical connection paths between the PCBA 150 and the actuator 142.

It will be appreciated that the rotatable media 140, actuator 42, transducers 146 and VCM 148 of FIG. 3 generally correspond to the memory module 104 of FIG. 1, and these elements cooperate to provide a non-volatile main memory store for the device 130. Additional memory, such as in the form of solid state volatile or non-volatile memory, can also be incorporated into the device such as on the PCBA 150.

Figure 5:
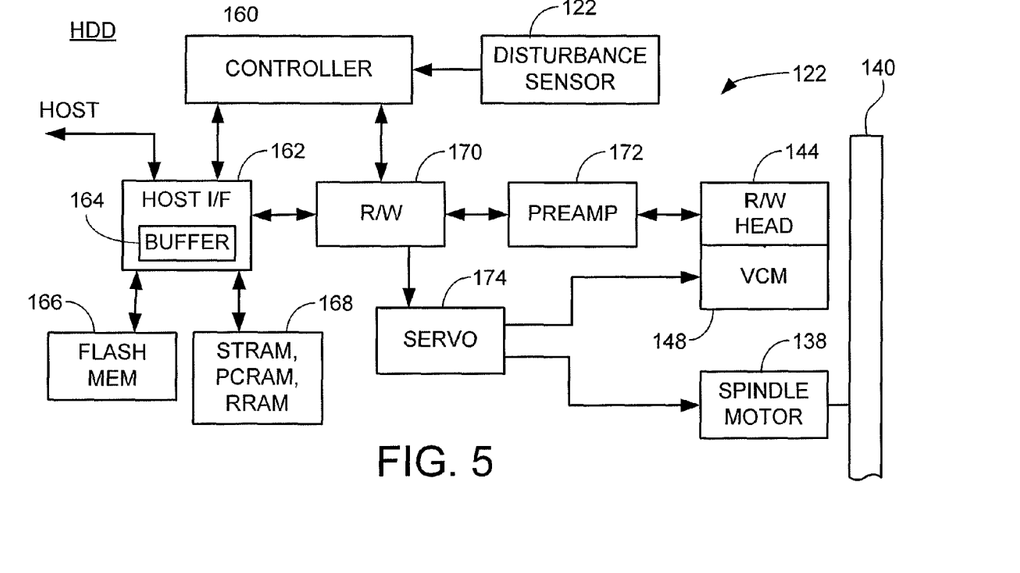
FIG. 5 is a functional block representation of the HDD in accordance with some embodiments.

FIG. 5 is a functional block representation of the HDD 130 of FIG. 4 in accordance with some embodiments. Controller 160 provides top level control of the device and directs host communications and data transfers via a host interface (I/F) 162 with volatile (e.g., DRAM) buffer memory 164. In the case of a hybrid drive, non-volatile solid-state memory may additionally be provided such as in the form of an erasable flash memory module 166 and/or a rewritable solid-state memory module 168. The module 168 may take the form of STRAM, PCRAM, RRAM, etc.

A read/write (R/W) channel 170 conditions data during write and read operations for transfers with the rotatable media 140. A preamplifier/driver (preamp) 172 applies write and read bias currents to the heads 144. A closed loop servo control circuit 174 uses demodulated servo control information from the media to provide control inputs to the VCM 148 and the spindle motor 138. The op vib (disturbance) sensor 122 from FIG. 2 provides disturbance event detection signals to the controller 160 during operation.

Figure 6:
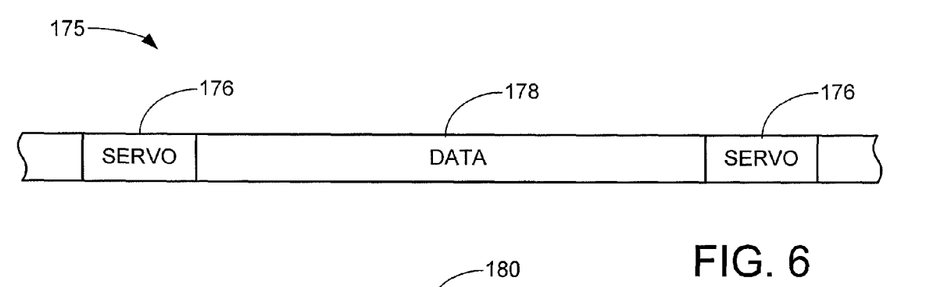
FIG. 6 is an exemplary format for a data track of the HDD.

Data are stored on the respective recording surfaces of the media (discs) 140 in the form of concentric tracks, one of which is represented at 175 in FIG. 6. The servo control information used by the servo circuit 174 is arranged in the form of spaced apart embedded servo data fields 176. The servo data fields 176 extend radially across the disc surface like spokes of a wheel and provide angular and radial position information to facilitate seeking and track following operations. User data are stored in data regions 178 along each track between adjacent pairs of the servo fields 176. The user data may be arranged in the form of fixed sized addressable sectors (e.g., logical block addresses or LBAs). The width and locations of the respective tracks 175 are established using the servo fields 176 as a reference.

Figure 7A:
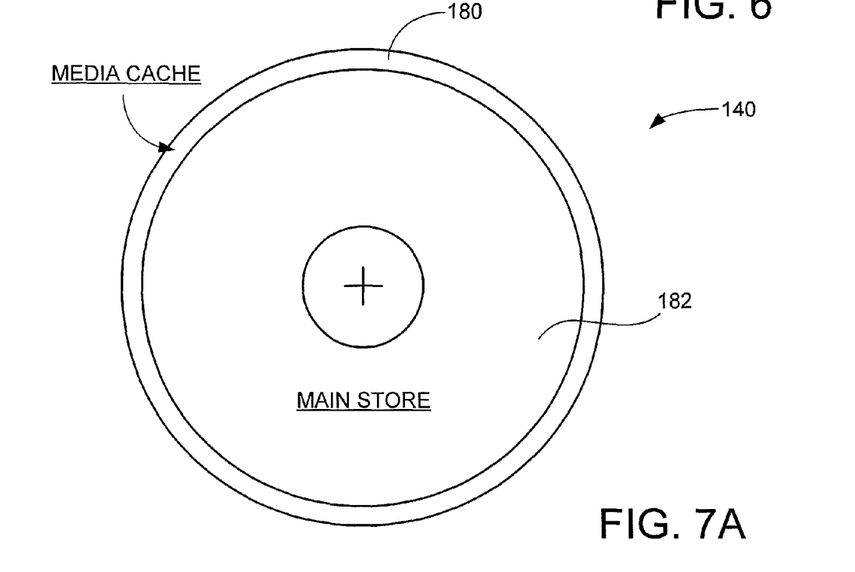
FIGS. 7A-7B show an arrangement of a media cache area and a main store area on one or more rotatable magnetic recording media (discs) of the HDD in accordance with some embodiments.

The HDD 130 of FIGS. 4-5 is capable of incorporating a media cache arrangement in a variety of ways. FIG. 7A illustrates a first embodiment in which the recording surface of a selected rotatable medium (disc) 140 is divided into a media cache 180 and a main store 182. Each or the remaining recording surfaces of the respective discs 140 can be similarly configured as in FIG. 7A, or less than all of the surfaces can be so configured so that other surfaces are only dedicated as main store areas 182 and do not include the media cache area 180.

The media cache 180 constitutes a relatively smaller number of tracks located near an outermost diameter (OD) of the disc 140, and the main store 182 constitutes a relatively larger number of tracks located in the medial extent and toward the innermost diameter of the disc 140. Other arrangements can be used, however, so that the respective media cache and main store can constitute substantially any respective locations on the disc surfaces.

Figure 7B:
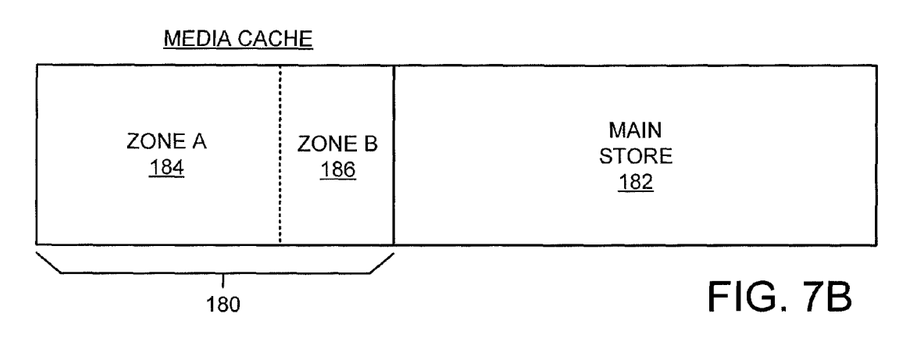

FIG. 7B is a graphical representation of the media cache 180 and main store 182 from FIG. 7A. It will be appreciated that in practice, the main store 182 will tend to be significantly larger in size in terms of both areal extent and overall data storage capacity as compared to the media cache 180.

The media cache 180 is partitioned into respective zones 184, 186. The zones are denoted as Zone A and Zone B, with Zone B configured to accommodate significantly higher levels of op vib as compared to Zone A in the manner discussed above in FIG. 2. Zone B is relatively smaller than zone A, although such is merely exemplary and not necessarily limiting.

Figure 8A:
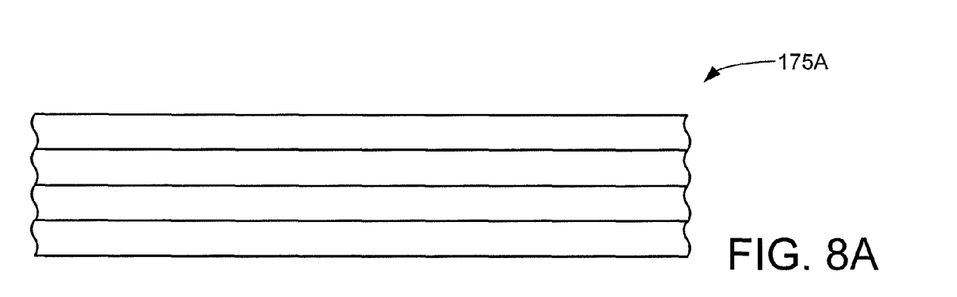
FIGS. 8A-8C illustrate different track formats that may be utilized in the media store and/or main store areas of FIGS. 6-7.
Figure 8B:
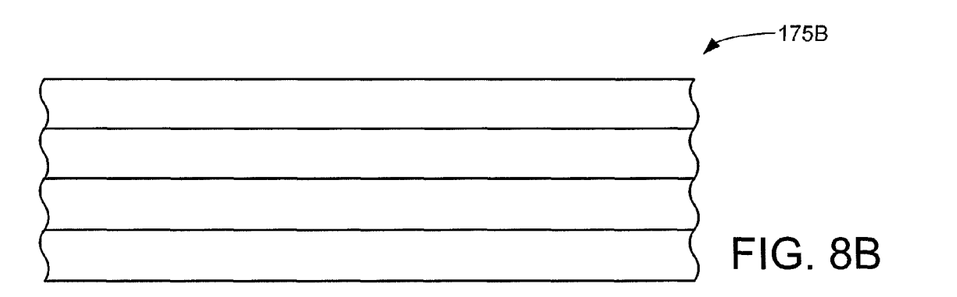

In one embodiment, the respective zones A and B are provided with tracks having different relative widths. By way of illustration, FIG. 8A shows a number of adjacent tracks 175A having a first, relatively narrower radial width, and FIG. 8B shows another number of adjacent tracks 175B having a second, relatively wider radial width. Narrower tracks such as 175A are defined in zone A and wider tracks such as 175B are defined in zone B. It can be seen that the use of the relatively wider tracks 175B in FIG. 8B can tend to increase the ability of the servo control circuit 174 (FIG. 5) to maintain the write element of the associated head 144 nominally centered over a given track in the presence of operational vibration.

Those having skill in the art will recognize that embedded servo control systems such as 174 can include a so-called write fault threshold (WFT), also referred to herein as an off-cylinder limit (OCLIM) value. The OCLIM value represents a threshold distance away from the nominal center of the track at which further writing of data to that track is temporarily interrupted (a so-called "write fault"). The OCLIM can be calculated and monitored in a variety of ways, such as through the generation of a position error signal (PES).

OCLIM values may be expressed in terms of a percentage of the overall nominal radial width of the track, such as +/−15%. Thus, if the estimated/detected position of the center of the write element is determined to be greater than this value, a write gate (enable) signal may be deasserted to temporarily halt the further writing of data until the head can be brought back within the OCLIM range. This operation tends to reduce the likelihood that adjacent track interference (ATI) occurs by partially overwriting the data on an immediately adjacent track.

In some embodiments, the same OCLIM values are supplied for both the tracks in zone A (e.g., tracks 175A) and the tracks in zone B (e.g., tracks 175B). In other embodiments, a larger OCLIM value may be provided for the tracks in zone B as compared to the tracks in zone A. The use of a relatively larger OCLIM value will further reduce the susceptibility of zone B to op vib.

Table I sets forth exemplary values for the respective zones A and B of FIGS. 7A-7B in some embodiments:

TABLE I

|  | Zone A | Zone B |
| --- | --- | --- |
| Track Density (kTPI) | 551.2 | 448.8 |
| OCLIM (%) | 0.11 | 0.16 |
| Data Capacity (GB) | 21.2 | 9.4 |

Track density refers to the total number of tracks per unit of radial distance (in this case, thousands of tracks per inch, or kTPI). OCLIM represents the write fault threshold distance (11% for zone A, 16% for zone B). Data capacity indicates the respective total available data storage capacity of the respective zones in gigabytes, GB ($10^{12}$ bytes).

It can be seen that the total capacity of the media cache 180 in this embodiment is nominally 30 GB, with about 70% dedicated to zone A storage and about 30% dedicated to zone B storage.

Figure 8C:
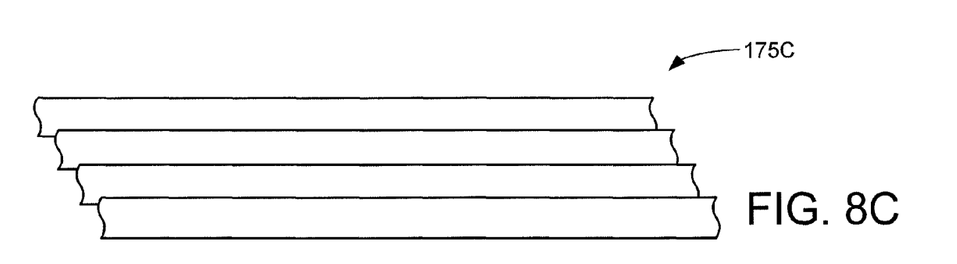

FIG. 8C shows another format for selected tracks 175C. The tracks 175C are characterized as partially overlapping (shingled) tracks. With shingled magnetic recording (SMR), tracks are written in sequence with each successively adjacent track partially overlapping an immediately previously written track. SMR techniques can enhance overall data density since the effective operational width of a read element can be narrower than the operational width of a write element. The various styles of tracks 175A, 175B and 175C can be variously used in the respective zones of the media cache 180 and/or the main store 182 as required; that is, narrow tracks, wide tracks and/or shingled tracks can be used in the media cache and/or the main store.

Figure 9:
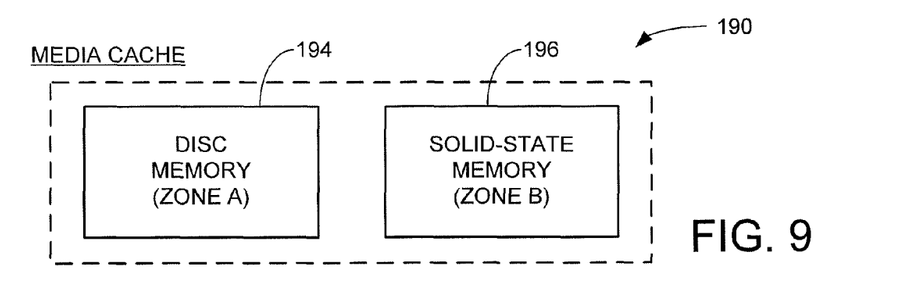
FIG. 9 illustrates another format for the media cache of the HDD which uses rotatable magnetic recording media and solid-state memory media.

FIG. 9 depicts an alternative media cache arrangement for the HDD 130 of FIGS. 4-5. In FIG. 9, a media cache 190 includes first and second zones 196, 198. The first zone 194 (zone A) is formed using a portion of rotatable disc memory such as the media cache area 180 depicted in FIG. 6A. The second zone 196 (zone B) is formed using solid-state non-volatile memory, such as the flash memory module 166 or the rewritable (STRAM, PCRAM, RRAM) module 168 in FIG. 5.

Generally, it will be appreciated that solid-state memory such as the flash memory module 166 or rewriteable memory module 168 may tend to be less susceptible to operational vibration as compared to rotatable disc memory 140, since the solid-state memory has fewer (or no) moving parts. Accordingly, in this embodiment the HDD 130 is configured to normally cache input write data to the rotatable media zone A, and to alternatively cache the data to the solid-state media zone B in the presence of operational vibration that exceeds a predetermined threshold.

Figure 10:
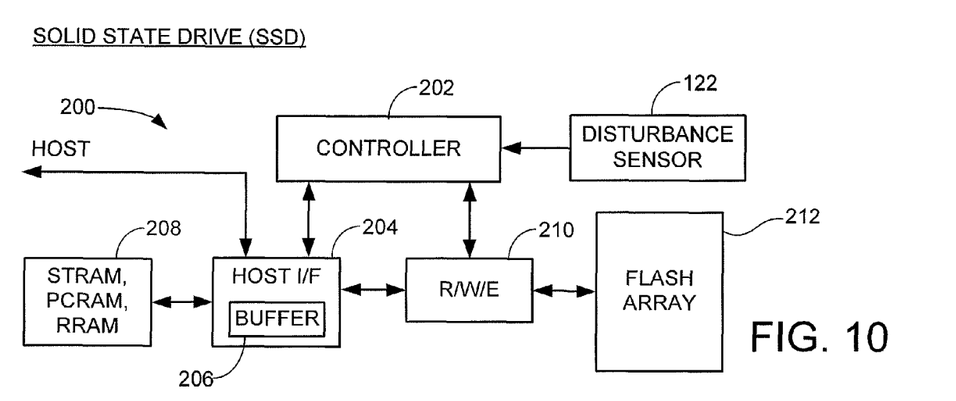
FIG. 10 is a functional block representation of a solid-state drive (SDD) in accordance with further embodiments.

While solid-state memory may be less susceptible to operational vibration as compared to other forms of memory, it does not follow that solid-state memory is wholly impervious to operational vibration and attendant environmental disturbances. Accordingly, FIG. 10 provides another functional block representation of a data storage device 200 generally corresponding to the data storage device 100 of FIG. 1. The storage device 200 is characterized as a solid-state drive (SSD). FIG. 10 demonstrates that the various media caching techniques disclosed herein are not necessarily limited to devices that incorporate rotatable magnetic recording media.

The SSD includes a top level controller 202, host interface (I/F) 204 with volatile buffer memory 206, rewritable solid-state memory (e.g., STRAM, PCRAM, RRAM) 208, a read/write/erase (R/W/E) channel 210 and an erasable flash memory array 212. As before, the disturbance sensor 122 (FIG. 2) supplies an indication of detected operational vibration disturbance to the controller 202.

As will be recognized, erasable memory such as the flash memory cells in the flash array 212 require an erasure operation to reset the storage state of the cells prior to receiving new, replacement data. By contrast, the rewritable memory in module 208 such as STRAM, PCRAM and RRAM can be directly overwritten with new data without requiring an intervening erasure operation.

In some embodiments, a media cache arrangement is implemented in the SSD 200 whereby different forms of erasable and/or rewritable solid-state memory are used under different operational vibration conditions. For example, if it is determined that certain forms of the rewritable memory in module 208 provide better write performance as compared to the flash memory cells in the flash array 212, data may be cached in the module 208 prior to transfer to the flash array 212.

Figure 11:
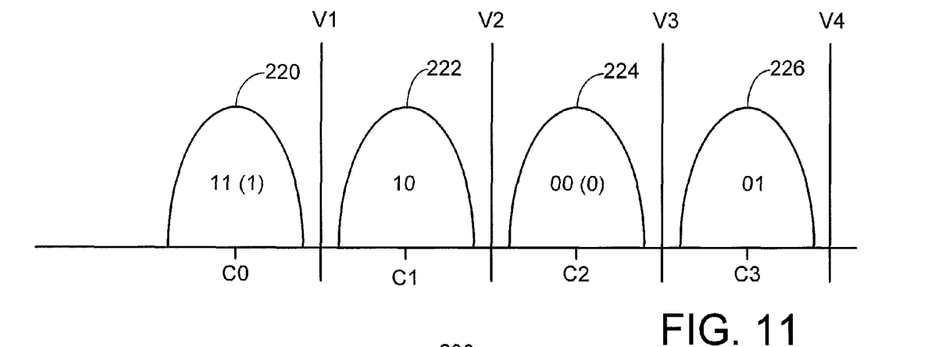
FIG. 11 graphically represents different charge distributions for programmed memory cells in the SSD of FIG. 10.

FIG. 11 illustrates different charge distributions 220, 222, 224 and 226 for different programming states of the flash memory cells in the flash array 212 of FIG. 10. Each of the distributions is substantially Gaussian in nature, although other distributions can be provided. Each of the charge distributions represents a total population of the memory cells programmed to different levels of accumulated charge (C0>C1>C2>C3). Distribution 220, for example, represents a lowest level of accumulated charge and generally corresponds to an erased state, and distribution 226 represents a highest level of accumulated charge.

The programming states of the cells are represented as 11 (1), 10, 00 (0) and 01, respectively. During single level cell (SLC) programming, a single bit is stored to each cell. If a logical 1 is stored to the cell, the cell will generally fall within distribution 220; if a logical 0 is stored to the cell, the cell will generally fall within distribution 224.

The cells may be further configured to store multiple bits per each cell using multi-level cell (MLC) programming. In this case, the most significant bit of the logical state represents a bit from a first data set (page) and the least significant bit of the logical state represents a bit from a second data set (page). The various SLC and MLC data states can be sensed through the application of suitable read voltage thresholds V1-V4.

In some embodiments, a media cache is formed utilizing flash memory cells configured as in FIG. 11, with the cells programmed as MLCs during low operational vibration levels and the cells programmed as SLCs during high operational vibration levels.

MLCs are often programmed by appending a second set of data to a group of memory cells initially programmed as SLCs. Hence, when presented with a selected set of input data, the media cache controller (124, FIG. 3) can determine the then-existing level of operational vibration. If this op vib level is relatively low, the controller 124 may operate to write the input data to an existing set of SLCs to convert the cells to MLCs. If the op vib level is relatively high, however, the controller 124 may instead write the data to a different, erased set of memory cells to form another group of SLCs.

Various types of rewritable solid-state memory cells such as STRAM, PCRAM and RRAM can be configured to accept MLC programming using multiple available resistive states. Thus, similar processing can be applied to such cells so that the cells receive SLC and MLC programming in relation to the detected levels of operational vibration.

In further embodiments, the writing of data under different op vib conditions can be tuned using different write parameters, such as different programming voltages, different read/verify levels, different amounts of transferred charge, different numbers of programming steps, etc. in relation to the detected operational vibration level. Empirical analysis can determine the sensitivity of a given system to different disturbance effects and appropriate parametric levels can be applied accordingly.

Figure 12:
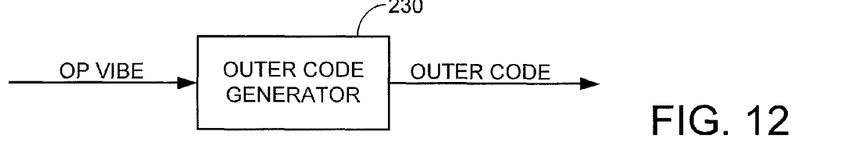
FIG. 12 shows an outer code generator that can be utilized in accordance with various embodiments.

FIG. 12 illustrates another aspect of various embodiments. An outer code generator 230 is operative to generate outer code. The outer code can take a variety of forms but generally comprises error detection and correction (EDC) codes that enable the detection and correction of up to selected numbers of errors. The outer code can include Reed Solomon codes, parity values, check sums, BCH (Bose-Chaudhuri-Hocquenghem) codes, etc. The outer codes, also referred to herein as product codes or enhanced super parity codes, provide error detection and correction capabilities for multiple blocks (sectors) of data.

Figure 13:
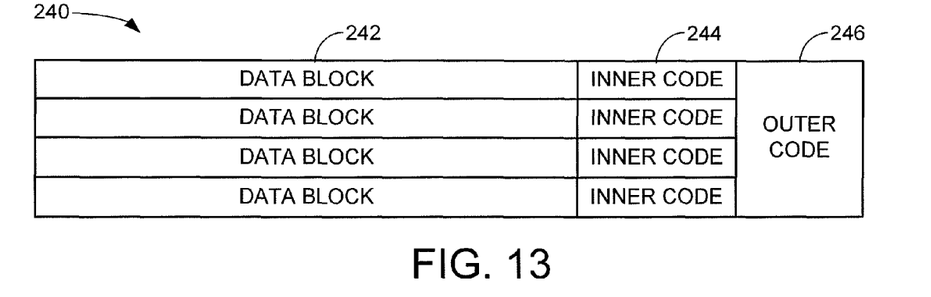
FIG. 13 illustrates the generation and use of outer code using the circuitry in FIG. 12.

FIG. 13 is an illustration of a super parity block 240 that employs outer codes generated by the generator 230 from FIG. 12. A number of data sectors (blocks) 242 store encoded user data. Each of the data sectors 242 may be of a fixed or a variable length and may include other forms of encoding such as encryption, hashing, run-length limited encoding, etc. The data sectors 242 each have an inner code block 244 comprising EDC codes configured to enable the detection and correction of a selected number of errors in the associated sector.

An outer code block 246 is calculated based on the data sectors 242 and the inner code blocks 244. In this way, the outer code provides an additional measure of protection for the data stored in the data sectors 242. While the super parity block 240 encompasses a total of four (4) sectors 242, any suitable number of sectors can be incorporated into the block 240 as desired.

Accordingly, in another embodiment write data are written to the various types of data making up the media cache as discussed above (e.g., rotatable media or solid-state media). The default configuration for the writing of the data to the media cache includes the generation of the inner code EDC values 244. In the presence of sufficient levels of detected operational vibration, however, the generator 230 (FIG. 12) operates to generate on-the-fly outer code values 246 which are appended to the data and also written to the media cache.

In further embodiments, the strength of the outer codes generated by the outer code generator 230 is selected to ensure recovery of the data based on the detected operational vibration level. Generally, the number of sectors that are unrecoverable using the associated inner code values should not exceed the correction power of the outer code value (the latter of which is referred to as the T level). Stated another way, the number of symbols that need to be corrected should not exceed the correction capability of the product code, including allowances for iterative decoding (such as in the case of BCH codes). An optimum solution selects the T level dynamically based on various factors, including empirical analysis of previous correction performance in light of similar levels of operational vibration. Other factors such as aging, data retention, observed bit error rate (BER), etc. can also be included in the determination of the appropriate T level.

In one embodiment, outer codes are generated for all data writes to the media cache, with a first, lowest T level applied during periods of nominal operational vibration, a second, intermediate T level applied during moderate amounts of operational vibration, and a third, highest T level applied during extreme amounts of operational vibration. It will be noted that the selected use of outer codes as in FIGS. 12-13 do not necessarily require the physical segregation of the data in the respective zones; that is, data may be sequentially written to adjacent tracks, with the data on the tracks during which larger levels of operational vibration were experienced having greater levels of outer code, and hence, making up the "zone B" portion of the media cache.

The media cache controller (e.g., 124, FIG. 3) can further utilize dynamic mapping techniques during the caching of data to the media cache. Dynamic mapping retargets the location of the data for which a write attempt failed. For example, should a write fault be declared due to the exceeding of the associated OCLIM value and an established correlation to an operational vibration event and/or level detected by the sensor 122, the system can immediate retarget a new location for the data, such as from zone A to zone B. This is analogous to a write retry operation, but does not require a full revolution of the media to realign the write element with the location on the media at which the write fault event occurred.

Thus, even if the detected amount of vibration indicates that zone A is the appropriate zone to write the data, the occurrence of a write fault during the writing of the data to zone A can cause the system to abort the writing process and to immediate transition to writing the data to zone B. Additionally or alternatively, other system parameters can be dynamically adjusted on-the-fly responsive to the detection of write faults during the write process, such as the generation (and recording) of higher strength outer code, the transition to different media (e.g., solid-state) or programming formats thereof (e.g., SLC), the dynamic increasing of track pitch and/or width, etc.

Figure 14:
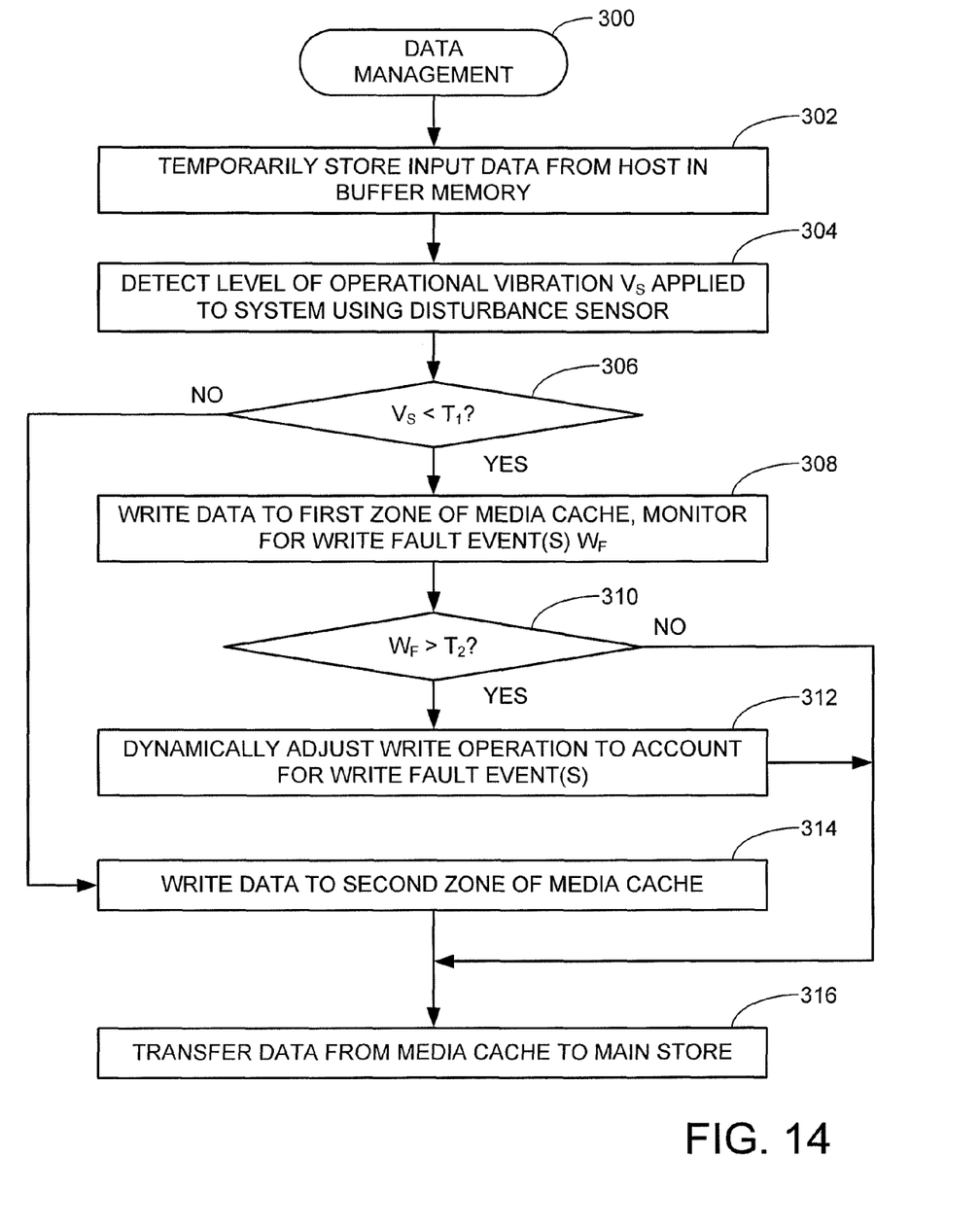
FIG. 14 is a flow chart for a DATA MANAGEMENT routine generally illustrative of steps carried out in accordance with various embodiments.

FIG. 14 provides a DATA MANAGEMENT routine 300, generally illustrative of steps that may be carried out in accordance with the various foregoing embodiments. It is contemplated that the routine 300 is carried out via a data storage device 100 as set forth in FIG. 1, configured with a media cache 106 and a main store 108 such as in FIG. 2, and suitable control circuitry such as but not limited to the sensor 122 and controller 124 in FIG. 3.

A write command is received from a host device at step 302 to store input data in the storage device main store. The input data may be temporarily stored in a local buffer memory, such as the volatile buffer memory of FIGS. 5 and 10, in anticipation of transfer of the data to the media cache.

The level of operational vibration, denoted herein as $V_S$, is next detected at step 304 using a suitable disturbance sensor. This level may be characterized in a variety of ways, such as instantaneous maximum acceleration, a time-summed average acceleration component over a rolling window, etc.

The characterized operational vibration is next compared to one or more predetermined thresholds, such as threshold $T_1$ at decision step 306. If the operational vibration is less than the threshold, the system is characterized as experiencing a normal (baseline) level of operational vibration, and the data are thereafter transferred to the first zone (e.g., zone A) of the media cache, as indicated by step 308.

During the writing of data to the first zone, the write operation is monitored for the occurrence of one or more write fault events $W_F$. As discussed above, the write fault events may be declared due to the head position exceeding the specified OCLIM value for a track based write. Other forms of write faults may be declared as well for other reasons, including voltage-based write faults, etc.

If the detected number of write fault events exceeds a second threshold T2, as indicated by decision step 310, the flow passes to step 312 where one or more dynamic adjustments are implemented to account for the write fault events. Such dynamic adjustments may include the aborting of the writing of the data to zone A and a rescheduling of the writing of the data to zone B. Alternatively, on-the-fly parametric adjustments may be made including the calculation of suitable outer code values, adjustments in writing voltages, adjustments in the programming style (e.g., SLC), adjustments in track parameters (track width), etc.

Returning to decision step 306, if the level of detected operational vibration $V_S$ is greater than the threshold $T_1$, the flow passes to step 314 where the data are written to the second zone (e.g., zone B) of the media cache. Monitoring of the writing process can be carried out and dynamic adjustments made accordingly as in step 312. However, it is contemplated that the second zone is particularly configured to be less susceptible to operational vibration and other issues that may result in the declaration of write faults, so that no further dynamic adjustments may be required during the writing of the data to the second zone. As discussed above, the second zone may be a different location as compared to the first zone, and may involve a different memory type (e.g., solid-state rather than rotatable memory), the generation of additional outer codes, other programming formats, etc.

Thereafter, the data, whether written to the first zone or the second zone in the media cache, are migrated to the main store at step 316. In some cases, an aging mechanism may be employed so that older data tend to be migrated sooner than newer data. In other cases, priority may be assigned to the data in the second zone (zone B) so that data in the second zone are cleared prior to, or with a greater weight, than data from the first zone.

It is contemplated that the location and type of memory used for the media cache will be predetermined during the device design phase. In other embodiments, evaluation of device performance during manufacturing testing or subsequent field use may result in the identification of certain locations (e.g., certain heads/zones/tracks, etc.) that naturally exhibit superior performance in response to operational vibration. The device can be configured to identify and select such location(s) to become the media cache area, or to form a portion of the media cache area. Similarly, different locations within an existing media cache area found to exhibit superior performance in response to operational vibration can be designated to receive data during periods of higher operational vibration.

While various embodiments described herein have generally used a single operational vibration measurement, more complex decision schemes can be implemented that utilize multiple sensors and/or multiple sensor outputs. Composite signals including multi-axial sensing and rolling averages are contemplated and can be readily implemented. Filtering, pattern detection and event prediction techniques can also be employed as desired.

In further cases, data written to a first zone in the media cache may be migrated to a second zone in the media cache responsive to detected levels of operational vibration. The transfer of data to the main store may involve the writing of a copy of the data to the main store while retaining the data in the media cache for read caching purposes. Cache retention policies can be invoked including least recently used (LRU) eviction schemes. Different retention policies can be assigned to the different zones within the media cache.

It will be understood that operational vibration measurements may be carried out on a regular, repeating basis and these measurements are available for reference by the controller when making caching decisions. Specific measurements may be called for and carried out at particular times, including at times of relatively higher observed operational vibration, to aid in the decision process.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed. For example, the particular elements may vary depending on the particular application without departing from the spirit and scope of the present technology.

What is claimed is:

1. A method comprising: partitioning a non-volatile media cache of a data storage device into at least first and second zones, each of the first and second zones disposed on a rotatable data recording medium, the first zone comprising a first set of non-overlapping tracks at a first track density and the second zone comprising a second set of non-overlapping tracks at a second, lower track density; receiving input data to be stored in a non-volatile main memory of the data storage device; measuring an amount of operational vibration associated with the data storage device; and storing the input data in a selected one of the first or second zones of the media cache prior to transfer to the main memory responsive to a comparison of the measured amount of operational vibration to a predetermined operational vibration threshold, the input data stored in the first zone responsive to the measured amount of operational vibration falling below the predetermined operational vibration threshold, the input data stored in the second zone responsive to the measured amount of operational vibration exceeding the predetermined operational vibration threshold.

2. The method of claim 1, further comprising writing multiple blocks of input data to the first zone at different times during which the measured amount of operational vibration is below the predetermined operational vibration threshold until the first zone is filled, followed by writing at least one additional block of input data to the second zone during which the measured amount of operational vibration is also below the predetermined operational vibration threshold.

3. The method of claim 1, wherein each of the first set of non-overlapping tracks in the first zone have a first radial width, and each of the second set of non-overlapping tracks in the second zone have a second radial width greater than the first radial width.

4. The method of claim 1, wherein each of the first set of non-overlapping tracks in the first zone have a first write fault threshold (WFT) level in a direction toward the innermost diameter (ID) of the rotatable medium, and each of the second set of non-overlapping tracks in the second zone have a second WFT level in a direction toward the ID of the rotatable medium, the second WFT level greater than the first WFT level.

5. The method of claim 4, wherein each of the first set of non-overlapping tracks in the first zone further have the first WFT level in a direction toward the outermost diameter (OD) of the rotatable medium, and each of the second set of non-overlapping tracks in the second zone further have the second WFT level in a direction toward the OD of the rotatable medium, the second WFT level greater than the first WFT level.

6. The method of claim 1, further comprising generating a first set of error detection and correction (EDC) codes as inner codes to detect and correct up to a selected number of errors in the input data, the first set of EDC codes generated irrespective of the measured amount of operational vibration, and writing the input data and the first set of EDC codes to the selected one of the first or second zones of the media cache.

7. The method of claim 6, further comprising generating a second set of EDC codes as outer codes to detect and correct up to a selected number of errors in the input data responsive to the measured amount of operational vibration and storing the input data, the first set of EDC codes and the second set of EDC codes in the second zone of the media cache.

8. The method of claim 1, wherein different sets of input data are transferred to the respective first and second zones of the media cache responsive to the associated amounts of operational vibration applied to the data storage device, wherein the second zone stores data transferred during a period of operational vibration higher than the predetermined operational vibration threshold and the first zone stores data transferred during a period of operational vibration lower than the predetermined operational vibration threshold, and wherein the method further comprises transferring the sets of input data stored in the second zone to the main memory, followed by transferring the sets of input data stored in the first zone to the main memory.

9. The method of claim 1, further comprising a subsequent step of transferring the input data from the first or second zone of the media cache to the main memory of the data storage device.

10. A data storage device comprising: a non-volatile main memory; a non-volatile media cache comprising a semiconductor memory partitioned into respective first and second zones each having different recording densities; a sensor adapted to sense an amount of operational vibration applied to the data storage device; and a controller adapted to store input data received from a host device in a selected one of the first or second zones of the media cache prior to transfer to the main memory responsive to a comparison of the sensed amount of operational vibration from the sensor to a predetermined operational vibration threshold so that the input data written to the first zone are written at a first recording density and the input data written to the second zone are written at a different, second recording density less than the first recording density.

11. The device of claim 10, wherein the semiconductor memory comprises a flash memory formed of an array of flash memory cells, the first zone comprising a first portion of the flash memory cells each configured to store a first number of bits of input data, the second zone comprising a second portion of the flash memory cells each configured to store a different, second number of bits of input data less than the first number of bits of input data.

12. The device of claim 11, wherein the flash memory cells in the first zone are multi-level cells (MLCs) and the flash memory cells in the second zone are single-level cells (SLCs).

13. The device of claim 10, wherein the non-volatile main memory is a rotatable data recording medium.

14. The device of claim 10, wherein the non-volatile main memory is a second semiconductor memory.

15. A data storage device comprising:
a non-volatile rotatable data recording medium having a plurality of concentric data tracks divided into a main store and a media cache, the main store configured for longer term storage of user data and the media cache configured for temporary storage of user data prior to transfer to the main store, the media cache partitioned into at least a first zone and a second zone, the first zone comprising a first set of tracks at a first track density and the second zone comprising a second set of tracks at a different, second track density less than the first track density;
a volatile buffer adapted to temporarily store input user data received from a host;
a sensor adapted to generate a disturbance signal indicative of applied operational vibration to the data storage device; and
a controller adapted to transfer the input user data from the buffer to a selected one of the first or second zones of the media cache responsive to a magnitude of the disturbance signal, and to subsequently transfer the input user data from the selected one of the first or second zones of the media cache to the main store, the controller further adapted to use write fault threshold (WFT) values of X % of track width in a selected radial direction during all writes to the first set of tracks and to use WFT values of Y % of track width in the selected radial direction during all writes to the second set of tracks, where X<Y.

16. The data storage device of claim 15, wherein the main store of the data recording medium has a third set of tracks at a third track density equal to the first track density and greater than the second track density.

17. The data storage device of claim 15, wherein the controller operates to store the input user data to the first zone of the media cache responsive to the magnitude of the disturbance signal indicating a level of operational vibration lower than a threshold level of operational vibration is being applied to the data storage device, wherein the controller operates to store the input user data to the second zone of the media cache responsive to the magnitude of the disturbance signal indicating a level of operational vibration higher than the threshold level of operational vibration is being applied to the data storage device, and wherein the controller further operates to generate at least one error detection and correction (EDC) code and to store the generated at least one EDC code to the second zone of the media cache responsive to the magnitude of the disturbance signal indicating said level of operational vibration higher than the threshold level of operational vibration is being applied to the data storage device.

18. The data storage device of claim 15, wherein the first and second sets of tracks are each characterized as non-shingled tracks so that each track in the first and second sets of tracks can be rewritten without requiring the rewriting of at least one adjacent track.

19. The data storage device of claim 15, wherein each track in the first set of tracks is a non-shingled track having a first radial width, and each track in the second set of tracks is a non-shingled track having a second radial width greater than the first radial width.

20. The data storage device of claim 15, wherein the controller is further configured to use symmetric WFT values of +/−X % of track width during all writes to the first set of tracks and to use symmetric WFT values of +/−Y % of track width during all writes to the second set of tracks.

* * * * *